United States Patent [19]

Gray

[11] Patent Number: 4,482,465
[45] Date of Patent: Nov. 13, 1984

[54] HYDROCARBON-HALOCARBON REFRIGERANT BLENDS

[75] Inventor: Roy A. Gray, Bartlesville, Okla.

[73] Assignee: Phillips Petroleum Company, Bartlesville, Okla.

[21] Appl. No.: 472,688

[22] Filed: Mar. 7, 1983

[51] Int. Cl.³ ............................................. C09K 5/04
[52] U.S. Cl. ...................................... 252/67; 252/69; 252/162; 252/172; 62/114; 62/122
[58] Field of Search ................... 252/67, 69, 162, 172; 62/114, 122

[56] References Cited

U.S. PATENT DOCUMENTS

| | | | |
|---|---|---|---|
| 3,249,546 | 5/1966 | Eiseman, Jr. | 252/67 |
| 3,251,192 | 5/1966 | Rich, Jr. et al. | 62/58 |
| 3,597,183 | 8/1971 | Murphy et al. | 62/114 |
| 3,723,318 | 3/1973 | Butler | 252/67 |
| 3,936,387 | 2/1976 | Reusser | 252/171 |
| 3,992,167 | 11/1976 | Beddome | 62/18 |
| 4,101,436 | 7/1978 | Murphy et al. | 252/67 |
| 4,157,979 | 6/1979 | Walters | 252/162 |
| 4,261,847 | 4/1981 | Cooper | 252/67 |
| 4,354,955 | 10/1982 | Wittenhorst | 252/69 |

FOREIGN PATENT DOCUMENTS 676604  7/1979  U.S.S.R. ............................. 252/69

OTHER PUBLICATIONS

P. Sanders, *Principles of Aerosol Technology*, Van Nostrand Reinhold, pp. 143-154, 1970.
P. Sanders, *Handbook of Aerosol Technology*, 2nd Ed., Van Nostrand Reinhold, pp. 39+ and 231-249, 1979.
G. W. Jones and F. E. Scott, "Extinction of Propane and Butane Flames by Dichlorodifluoro Methane", U.S. Bureau of Mines Report, RI 3908, Jun., 1946.
Anon., "DuPont's Sterling Updates Propellant 152a", Aerosol Age, Jul., 1981, pp. 26-27.
J. D. Sterling, "FC-152a-A Useful Fluorocarbon Aerosol Propellant", Chemical Times and Trends, Jul., 1981, pp. 42-46.

Primary Examiner—Paul Lieberman
Assistant Examiner—Robert A. Wax

[57] ABSTRACT

A refrigeration process is conducted by employing as the refrigerant a mixture of one or more hydrocarbons and one or more halocarbons. The boiling points of the components of the mixture are bracketed in such a manner that the flammability of the mixture is reduced.

26 Claims, 2 Drawing Figures

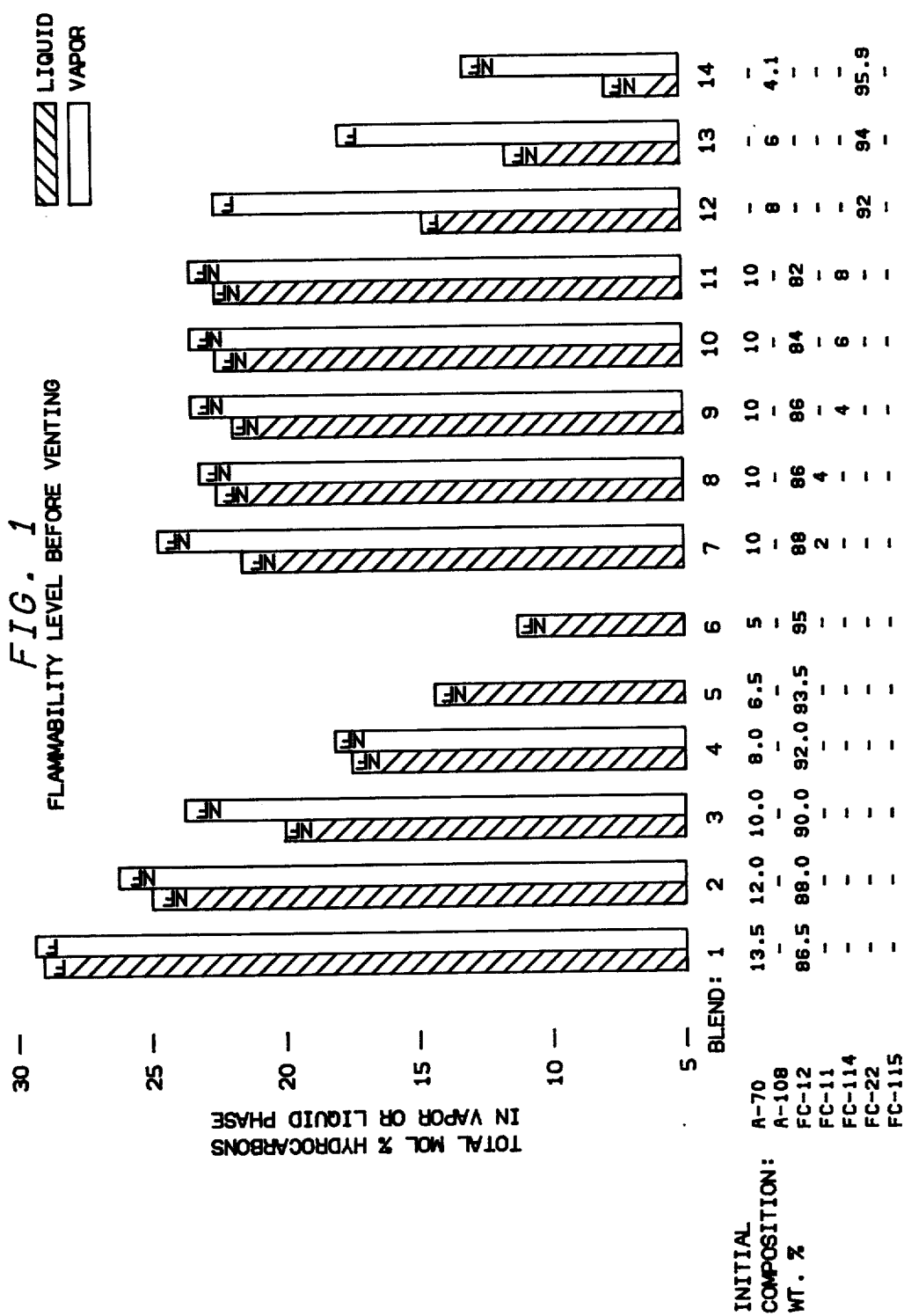

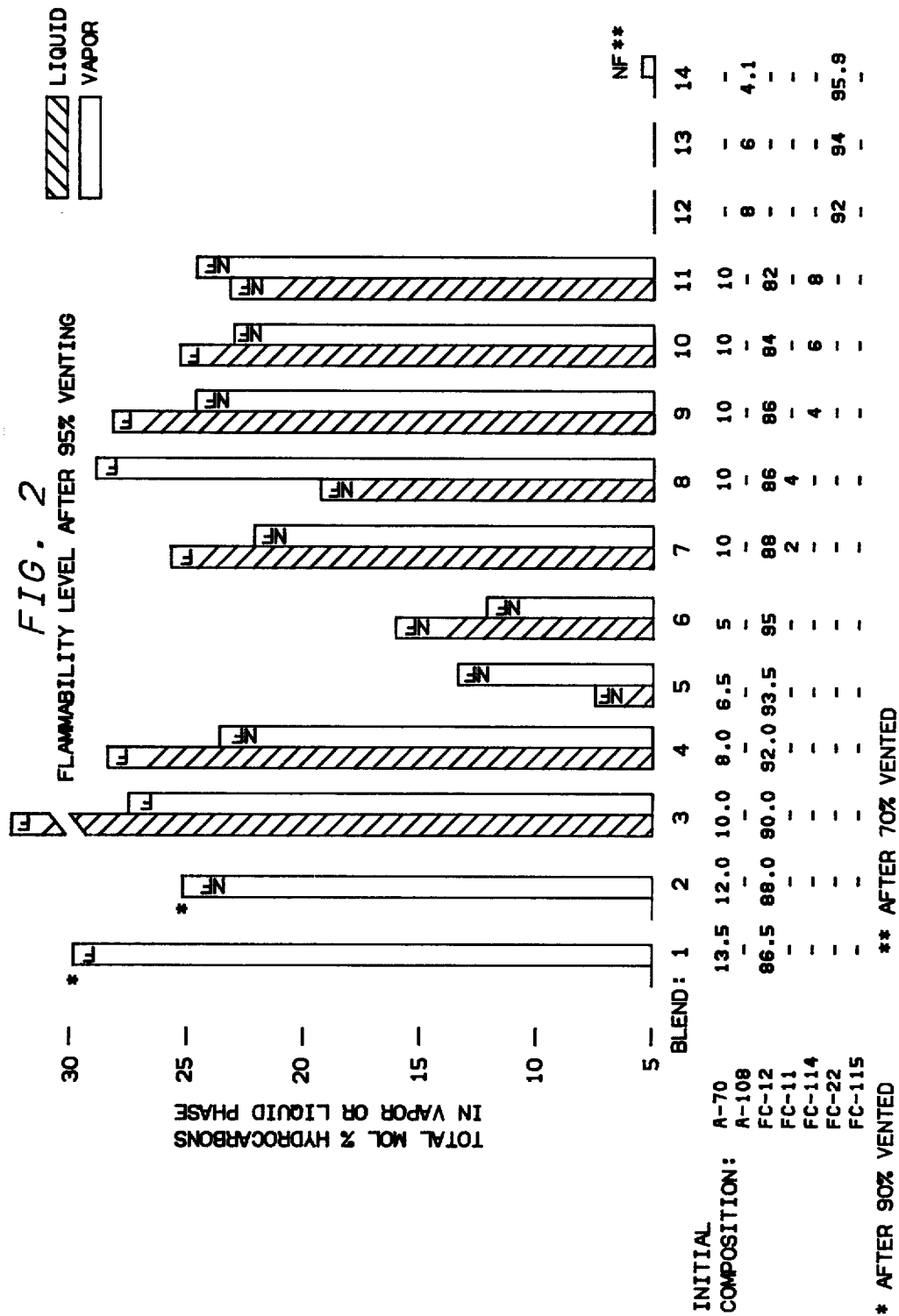

HYDROCARBON-HALOCARBON REFRIGERANT BLENDS

This invention relates to refrigeration and refrigerants.

The art of refrigeration is a relatively mature art in that much is known about it. The related technology has been successfully put into wide commercial practice. Broadly, refrigeration can be described as the utilization of physical change in a substance to produce a cooling effect. That physical change can be, for example, a change from the solid state to the liquid state or a change from the liquid state to the vapor state. The substance employed in this manner is known as a refrigerant.

An example of a refrigeration process is described in The Encyclopedia of Chemistry, Third Edition, Clifford A. Hampel at page 963;

The most commonly used process for making use of the change from liquid to vapor state of the refrigerant is the vapor compression cycle, which involves a recirculation of the refrigerant by means of a positive displacement compressor driven by a prime mover. In this process, high-pressure refrigerant vapor from the compressor enters a heat exchanger (condenser) in which it condenses, rejecting sensible heat from work done upon it during compression plus its latent heat of vaporization. The condensate flows through a restriction (expansion valve or other similar device) thus undergoing a drop in pressure, during which a sufficient portion of the refrigerant vaporizes to reduce the temperature of the remaining liquid to that consistent with the lower pressure. The liquid-vapor mixture then enters a heat exchanger (evaporator) and absorbs heat equivalent to the latent heat of vaporization of that portion of the refrigerant existing as liquid. The resulting low pressure vapor then passes to the compressor to complete the cycle. Thus it is evident that a refrigerant acts as an agent for transporting heat from a lower to a higher temperature level.

The principles and technology of refrigeration are well known to persons of skill in the art. For others desiring more knowledge concerning the subject many books, articles, etc. are available for study. More information can be obtained, for example, from the Kirk-Othmer Encyclopedia of Chemical Technology, Third Edition, Volume 20, pages 78–107, the disclosure of which is incorporated by reference herein.

Among the substances available for use as refrigerants are the halocarbons. The halocarbons include fluorinated carbon compounds, chlorinated carbon compounds and brominated carbon compounds. The fluorocarbons (i.e., fluorinated aliphatic compounds) are the most commonly used halocarbon refrigerants. A discussion relating to fluorocarbons (i.e., fluorinated aliphatic compounds) can be found in the Kirk-Othmer Encyclopedia of Chemical Technology, Third Edition, Volume 10, pages 856–870. Examples of halocarbon refrigerants include, but are not limited to, the following:

| Refrigerant Number | Chemical Name | Chemical Formula |
|---|---|---|
| 10 | carbon tetrachloride | $CCl_4$ |
| 11 | trichlorofluoromethane | $CCl_3F$ |
| 12 | dichlorodifluoromethane | $CCl_2F_2$ |
| 13 | chlorotrifluoromethane | $CClF_3$ |
| 13B1 | bromotrifluoromethane | $CBrF_3$ |
| 14 | carbon tetrafluoride | $CF_4$ |
| 20 | chloroform | $CHCl_3$ |
| 21 | dichlorofluoromethane | $CHCl_2F$ |
| 22 | chlorodifluoromethane | $CHClF_2$ |
| 23 | trifluoromethane | $CHF_3$ |
| 30 | methylene chloride | $CH_2Cl_2$ |
| 31 | chlorofluoromethane | $CH_2ClF$ |
| 32 | methylene fluoride | $CH_2F_2$ |
| 40 | methyl chloride | $CH_3Cl$ |
| 41 | methyl fluoride | $CH_3F$ |
| 110 | hexachloroethane | $CCl_3CCl_3$ |
| 111 | pentachlorofluoroethane | $CCl_3CCl_2F$ |
| 112 | 1,1,2,2-tetrachloro-1,2-difluoroethane | $CCl_2FCCl_2F$ |
| 112a | 1,1,1,2-tetrachloro-2,2-difluoroethane | $CCl_3CClF_2$ |
| 113 | 1,1,2-trichloro-1,2,2-trifluoroethane | $CCl_2FCClF_2$ |
| 113a | 1,1,1-trichloro-2,2,2-trifluoroethane | $CCl_3CF_3$ |
| 114 | 1,2-dichloro-1,1,2,2-tetrafluoroethane | $CClF_2CClF_2$ |
| 114a | 1,1-dichloro-1,2,2,2-tetrafluoroethane | $CCl_2FCF_3$ |
| 114B2 | 1,2-dibromo-1,1,2,2-tetrafluoroethane | $CBrF_2CBrF_2$ |
| 115 | chloropentafluoroethane | $CClF_2CF_3$ |
| 116 | hexafluoroethane | $CF_3CF_3$ |
| 120 | pentachloroethane | $CHCl_2CCl_3$ |
| 123 | 1,1-dichloro-2,2,2-trifluoroethane | $CHCl_2CF_3$ |
| 124 | 1-chloro-1,2,2,2-tetrafluoroethane | $CHClFCF_3$ |
| 124a | 1-chloro-1,1,2,2-tetrafluoroethane | $CHF_2CClF_2$ |
| 125 | pentafluoroethane | $CHF_2CF_3$ |
| 133a | 1-chloro-2,2,2-trifluoroethane | $CH_2ClCF_3$ |
| 140a | 1,1,1-trichloroethane | $CH_3CCl_3$ |
| 142b | 1-chloro-1,1-difluoroethane | $CH_3CClF_2$ |
| 143a | 1,1,1-trifluoroethane | $CH_3CF_3$ |
| 150a | 1,1-dichloroethane | $CH_3CHCl_2$ |
| 152a | 1,1-difluoroethane | $CH_3CHF_2$ |
| 160 | ethyl chloride | $CH_3CH_2Cl$ |
| 218 | octafluoropropane | $CF_3CF_2CF_3$ |
| C316 | 1,2-dichlorohexafluorocyclobutane | $C_4Cl_2F_6$ |
| C317 | chloroheptafluorocyclobutane | $C_4ClF_7$ |
| C318 | octafluorocyclobutane | $C_4F_8$ |
| 1112a | 1,1-dichloro-2,2-difluoroethylene | $CCl_2{=}CF_2$ |
| 1113 | chlorotrifluoroethylene | $CClF{=}CF_2$ |
| 1114 | tetrafluoroethylene | $CF_2{=}CF_2$ |
| 1120 | trichloroethylene | $CHCl{=}CCl_2$ |
| 1130 | 1,2-dichloroethylene | $CHCl{=}CHCl$ |
| 1132a | vinylidene fluoride | $CH_2{=}CF_2$ |
| 1140 | vinyl chloride | $CH_2{=}CHCl$ |
| 1141 | vinyl fluoride | $CH_2{=}CHF$ |

Hydrocarbons, especially the lower molecular weight hydrocarbons (i.e., molecular weight no more than about 72), have also been used as refrigerants. Examples of hydrocarbon refrigerants include, but are not limited to, the following:

| Refrigerant Number | Chemical Name | Chemical Formula |
|---|---|---|
| 50 | methane | $CH_4$ |
| 170 | ethane | $CH_3CH_3$ |
| 290 | propane | $CH_3CH_2CH_3$ |
| 600 | butane | $CH_3CH_2CH_2CH_3$ |
| 600a | isobutane (2-methylpropane) | $CH(CH_3)_3$ |
| 1150b | ethylene | $CH_2{=}CH_2$ |
| 1270b | propylene | $CH_3CH{=}CH_2$ |

Most halocarbon refrigerants are nonflammable and nontoxic. They have been widely used in refrigeration processes with great success. The halocarbon refrigerants, however, generally cost more than the hydrocarbon refrigerants. Furthermore, halocarbons, such as the fluorinated aliphatics, are believed to have an adverse environmental effect on the ozone layer in our atmosphere By employing a refrigerant that is a mixture of hydrocarbon and halocarbon instead of a refrigerant consisting only of halocarbon at least two advantages are gained. First, a savings in cost is realized because the hydrocarbon is less expensive than the portion of halocarbon replaced by it. Second, the use of less halocarbon mitigates the damage to the atmosphere.

A disadvantage associated with the use of a mixture of hydrocarbon and halocarbon as a refrigerant is found in the fact that the hydrocarbon is flammable. Hydrocarbon vapor in air forms a flammable mixture when the concentration of hydrocarbon vapor in the air falls within a range defined by the upper and lower flammability limits. The presence of a nonflammable halocarbon narrows this flammability range. As the amount of halocarbon is increased relative to the amount of hydrocarbon, the flammability range is further narrowed. At some point the amount of the halocarbon is sufficient to render the hydrocarbon/halocarbon combination completely nonflammable because the combination is incapable of forming a flammable mixture with air (i.e., the flammability range has been narrowed such that the upper and lower flammability limits coincide).

The problem of flammability associated with a hydrocarbon/halocarbon refrigerant is not as simple as the above discussion might seem to suggest. The danger of flammability is not completely eliminated by merely selecting an initial halocarbon concentration sufficiently high to render the initial mixture completely nonflammable. The complexity of the problem is illustrated by the following example.

Consider a refrigerant consisting of a hydrocarbon and a halocarbon wherein the concentration of halocarbon is sufficiently high such that the mixture is completely nonflammable. Assume that the refrigeration apparatus is damaged and the refrigerant is allowed to escape from confinement in the form of vapor. As the vapor refrigerant escapes liquid refrigerant evaporates to take its place. The evaporation will proceed so long as vapor continues to escape. The evaporation results in a fractionation of the components. The composition of the vapor escaping from confinement and of the liquid will differ and will change continually. If the hydrocarbon has a boiling point below that of the halocarbon the initial vapor phase fraction will have a hydrocarbon concentration higher than that of the liquid. Thus the initial vapor phase fraction may be flammable. As the evaporation (fractionation) proceeds the concentration of hydrocarbon in the vapor phase will decrease and the vapor will eventually become nonflammable. If the hydrocarbon has the lower boiling point the initial vapor phase fraction will have a halocarbon concentration higher than that of the liquid. Thus the initial vapor phase fraction will be nonflammable. As the evaporation (fractionation) proceeds the concentration of halocarbon in the vapor will decrease. The concentration of halocarbon in the vapor at the later stages of evaporation will be less than the concentration of halocarbon in the initial nonflammable refrigerant. The vapor becomes flammable when the amount of halocarbon relative to the amount of hydrocarbon falls below the point of nonflammability. This occurs despite the fact that the initial refrigerant was nonflammable.

It is one objective of this invention to provide a hydrocarbon-containing refrigerant of reduced flammability. This objective and other objectives, advantages and aspects of this invention will become apparent upon studying this disclosure and the appended claims.

In accordance with this invention, the refrigerant of this invention is used as a refrigerant in a refrigeration process. The refrigeration process can be any type that employs a refrigerant. The essence of this invention lies in the choice of refrigerant and not in any other aspect of refrigeration. For this reason, the terms refrigeration and refrigeration process should be broadly interpreted.

The refrigerant of this invention is a mixture of at least three components (a), (b) and (c) where the boiling point of (a) is lower than the boiling point of (b) and the boiling point of (b) is lower than the boiling point of (c). In one embodiment of this invention (a) and (c) are hydrocarbons and (b) is a substantially nonflammable halocarbon. In another embodiment of this invention (a) and (c) are substantially nonflammable halocarbons and (b) is a hydrocarbon. Note that in either case the boiling point of (b) is bracketed by the boiling points of (a) and (c).

This bracketing concept is utilized to reduce the problem of flammability associated with hydrocarbon/halocarbon refrigerant mixtures. Consider first the case where (a) and (c) are hydrocarbons. By dividing the total hydrocarbon content between the lowest boiling component (a) and the highest boiling component (c) the flammability-inhibiting influence of the substantialy nonflammable halocarbon is increased. Recall that the halocarbon will narrow the flammability range and, if a sufficient amount is present, render the mixture completely nonflammable. If the total hydrocarbon content is in (a) the initial vapor fractions will be high in hydrocarbon content and low in halocarbon content. During the later stages of evaporation the halocarbon content will be unnecessarily high. If the total hydrocarbon content is in (c) the initial vapor fractions will be unnecessarily rich in halocarbon content. The hydrocarbon will dominate the later stages of evaporation. By dividing the hydrocarbon content between (a) and (c), the halocarbon (b) will be useful during both the initial and later stages of evaporation.

Consider now the case where (a) and (c) are halocarbons and (b) is a hydrocarbon. The flammability-inhibiting influence of (a) is greatest during the first half of the evaporation. The flammability-inhibiting influence of (c) is greatest during the last half of the evaporation. By dividing the total halocarbon content between (a) and (c) the flammability of the mixture is more efficiently inhibited.

This invention is not limited to any amounts, relative or absolute, of the various components (a), (b) and (c). The most effective amounts of each will depend upon a number of factors such as, for example, the flammability of the hydrocarbon components, the boiling points or rates of evaporation of the components relative to each other, etc. With this in mind the guidelines given below are contemplated to be generally useful in the practice of this invention.

With respect to the mixture where (a) and (c) are hydrocarbons and (b) is a halocarbon, it is generally contemplated that the amount of (a) will be about 70 to about 130 percent by weight of the amount of (c). In one embodiment of the invention neither the amount of (a) nor the amount of (c) exceeds about 9 weight percent; and the total amount of (a) and (c) does not exceed about 12 weight percent based upon the total weight of (a), (b) and (c). More hydrocarbon can be used but the risk of increased flammability should be recognized.

With respect to the mixture where (a) and (c) are halocarbons and (b) is a hydrocarbon, it is generally contemplated that the amount of (a) will be about 70 to about 130 percent by weight of the amount of (c). In an embodiment of the invention the amount of (b) does not exceed about 12 weight percent based upon the total weight of (a), (b) and (c). More hydrocarbon can be used but the risk of increased flammability should be recognized.

The refrigerant of this invention is not limited to only three components. The refrigerant mixture containing (a) hydrocarbon, (b) halocarbon, and (c) hydrocarbon can further include (d) a second substantially nonflammable halocarbon where the boiling point of (d) is either lower than the boiling point of (a) or greater than the boiling point of (c). In this manner, the boiling point of either (a) or (c) is bracketed by the boiling points of (b) and (d). If the boiling point of (d) is less than the boiling point of (a), then (d) will primarily help reduce flammability during the initial stages of evaporation. If the boiling point of (d) is greater than the boiling point of (c), then (d) will primarily help reduce flammability during the later stages of evaporation. Although this invention is not limited thereto, it is generally contemplated that the amount of (d) will not exceed about 20 percent by weight of the amount of (b).

The refrigerant can include five or more components. A five component refrigerant could include, for example, (a) hydrocarbon, (b) halocarbon and (c) hydrocarbon as above plus (d) a substantially nonflammable halocarbon and (e) a substantially nonflammable halocarbon where the boiling point of (d) is greater than the boiling point of (c) and the boiling point of (e) is less than the boiling point of (a). In this manner the boiling points of both (a) and (c) are bracketed. Although this invention is not limited thereto, it is generally contemplated that neither the amount of (d) nor the amount of (e) will exceed about 20 percent by weight of (b).

Although this invention is not limited thereto, it is contemplated that the total amount of hydrocarbon in the refrigerant will generally not exceed about 12 weight percent based upon the total weight of hydrocarbon and halocarbon. For example, halocarbons (d) and (e), if used, should be included in the calculation of hydrocarbon weight percent. More hydrocarbon can be used but the risk of increased flammability should be recognized.

The hydrocarbons of this invention can be any of the hydrocarbons previously identified or any others that are useful for refrigeration purposes.

The halocarbons of this invention can be any of the halocarbons previously identified that are substantially nonflammable. Other substantially nonflammable halocarbons that are useful as refrigerants can also be used. The fluorinated aliphatic refrigerants are well suited for this invention.

The examples which follow are provided to help more clearly and more completely describe this invention.

EXAMPLE I

This example describes the procedure used for determining the flammability of the various hydrocarbon-fluorcarbon blends disclosed herein. Each test began by evacuating either a 6 ounce aerosol can without an induction (dip) tube or a heavy-duty tempered glass Fischer-Porter compatibility bottle having valves at both ends. The aerosol can was approximately 4.25 inches × 2 inches having a 223 milliliter capacity. The Fischer-Porter compatibility bottle was approximately 9 inches × 2 inches having a 350 milliliter capacity. The evacuated container (i.e., can or bottle) was pressure filled with the components of the desired blend to about two-thirds full. The pressure on the container did not exceed about 130 psig at 25° C. Each blend to be studied (liquid and gas phase) was generally analyzed prior to testing for flammability by GLC (gas-liquid chromatography) analysis using a 30 foot × 0.125 inch copper tubing packed with a standard material, 19 weight percent bis (2-methoxy ethoxy) ethyl ether and 1 weight percent squalene on 60-80 mesh chromosorb P. The column was operated isothermally at 40° C. using a flame ionization detector and a helium flow of 30 milliliters per minute. The blends were analyzed initially with the can full and after venting a specific amount of material, usually after 25, 50, 70, 90 and/or 95% vented.

The apparatus used for determining the flammability of these blends was a 630 milliliter capacity (10 inches × 50 millimeter I.D.) tempered glass cylinder into which air and the desired amount of vapor or liquid phase of the blend were directly admitted. The top of the glass cylinder was sealed with a rubber stopper containing a small vent, which was closed during ignition attempts, and the bottom of the cylinder was sealed with aluminum foil adhered to the cylinder with silicone grease. This permitted the safe release of combustion gases when ignition occurred. Two electrodes spaced 4 millimeters apart (gap) were situated approximately in the middle of the vertical cylinder. Each electrode entered the cylinder from opposite sides of the cylinder wall. One electrode was grounded and the other was attached to a high frequency, Tesla type, coil which consisted of an adjustable interruptor, a vibrating spark gap, a condenser, a resonator coil and a gap tip. The coil was capable of producing an adjustable spark from 0 to 50,000 volts.

The hydrocarbon-fluorocarbon blend vapor and an air stream were metered through separate calibrated rotameters and blended into a single stream which entered the bottom of the glass cylinder. Air entered the cylinder at 200 milliliters per minute. The rate at which the blend vapor entered the cylinder was varied from 27 to 51.5 milliliters per minute thus permitting testing of the blend/air mixture through much of its flammability range. An electric spark from the high frequency coil was passed across the electrode gap to ignite the vapor, if flammable.

Flammability determinations of the liquid phase was accomplished by injecting 0.2 to 0.4 milliliters of liquid, using a 5 milliliter capacity Pressure-Lok "Syringe" (Precision Sampling Corp.), directly into the air-filled ignition chamber. Since the syringe was calibrated into 0.1 milliliter divisions, small amounts of the liquids could be accurately dispensed. Usually 0.2 to 0.4 milliliters were used. The liquids was vaporized upon entering the ignition chamber. If flammable, the vaporized liquid was ignited in the manner described above.

EXAMPLE II

A hydrocarbon-fluorocarbon blend was prepared by weighing the amount of each component charged to the can or bottle. A typical analysis of the hydrocarbon used herein is shown in Table I.

TABLE I

| Hydrocarbon Composition | | | |
|---|---|---|---|
| | A-70[a] | A-108[a] | Boiling Point °F. |
| Ethane | 0.1 mol % | 0.1 mol % | — |
| Propane | 50.4 mol % | 99.0 mol % | −43.7 |
| n-Butane | 1.9 mol % | 0.1 mol % | 31.1 |
| Isobutane | 47.6 mol % | 0.8 mol % | 10.9 |

[a]Available from Phillips Petroleum Co. A-70 ® and A-108 ® are registered trademarks of Phillips Petroleum Company.

The A-70 is principally propane and isobutane. The A-108 is principally propane.

The fluorocarbons used herein are listed in Table II. These are referred to hereinafter as "FC".

TABLE II

| | Fluorocarbons | |
|---|---|---|
| Identification | Formula | Boiling Point °F. |
| FC-11[a] | $CCl_3F$ | 74.8 |
| FC-12[b] | $CCl_2F_2$ | −21.6 |
| FC-22[b] | $CHClF_2$ | −41.4 |
| FC-114[c] | $CClF_2CClF_2$ | 38.4 |

[a]Available from Kaiser Chem. Co., 14 or 16 ounce cans
[b]Purchased locally in 1 pound cans (14 or 16 ounces).
[c]Available from Matheson Division of Searle Medical Products, Inc.

EXAMPLE III

This example illustrates the level of flammability of a fluorocarbon-hydrocarbon mixture when subjected to various levels of venting. In this example, the fluorcarbon FC-12 has a boiling point between that of the two principal hydrocarbon components, propane and isobutane. The data listed in Table III indicate that the mixture was flammable in air whenever the fluorocarbon to hydrocarbon molar ratio was below about 2.7/1.

TABLE III

Flammability Level of a Hydrocarbon-Fluorocarbon Mixture

| Blend | Blend, Wt. % FC-12 | Wt. % A-70 | Wt. % Vented | Phase Tested | Composition Mole %[a] $C_3$ | FC-12 | $C_4$ | Ratio FC-12: Hydrocarbon | Flammability |
|---|---|---|---|---|---|---|---|---|---|
| 1 | 86.5 | 13.5 | 0 | Liquid | 14.6 | 71.4 | 14.0 | 2.50 | Yes |
| | | | | Vapor | 20.1 | 70.9 | 9.0 | 2.44 | Yes |
| | | | 50 | Liquid | 8.0 | 70.5 | 21.5 | 2.39 | — |
| | | | | Vapor | 13.0 | 74.0 | 13.0 | 2.85 | No |
| | | | 90 | Vapor | 6.0 | 70.5 | 23.5 | 2.39 | Yes |
| 2 | 88.0 | 12.0 | 0 | Liquid | 12.0 | 75.0 | 13.0 | 3.00 | No |
| | | | | Vapor | 17.0 | 73.7 | 9.3 | 2.80 | No |
| | | | 50 | Liquid | 8.0 | 74.2 | 17.8 | 2.88 | No |
| | | | | Vapor | 12.5 | 76.3 | 11.2 | 3.00 | No |
| | | | 90 | Vapor | 5.2 | 74.7 | 20.1 | 2.95 | No |
| 3 | 90 | 10 | 0 | Liquid | 11.1 | 78.7 | 10.2 | 3.69 | No |
| | | | | Vapor | 16.5 | 76.3 | 7.2 | 3.22 | No |
| | | | 25 | Liquid | 8.9 | 78.5 | 12.6 | 3.65 | No |
| | | | | Vapor | 14.1 | 78.3 | 7.6 | 3.61 | No |
| | | | 50 | Liquid | 5.3 | 78.2 | 16.5 | 3.59 | — |
| | | | | Vapor | 9.0 | 80.0 | 11.0 | 4.00 | No |
| | | | 70 | Liquid | 5.5 | 77.3 | 17.2 | 3.41 | No |
| | | | | Vapor | 8.8 | 79.9 | 4.3 | 6.1 | No |
| | | | 90 | Vapor | 3.8 | 76.4 | 19.8 | 3.24 | No |
| | | | 95 | Liquid | 1.4 | 62.8 | 35.8 | 1.69 | Yes |
| | | | | Vapor | 2.1 | 72.6 | 25.3 | 2.65 | Yes |
| 4 | 92 | 8 | 0 | Liquid | 8.6 | 82.8 | 8.6 | 4.80 | No |
| | | | | Vapor | 11.0 | 82.0 | 7.0 | 4.56 | No |
| | | | 25 | Liquid | 7.0 | 82.5 | 10.5 | 4.71 | No |
| | | | | Vapor | 9.7 | 83.7 | 6.6 | 5.13 | No |
| | | | 70 | Liquid | 4.2 | 81.5 | 14.2 | 4.43 | No |
| | | | | Vapor | 7.2 | 83.4 | 9.4 | 5.02 | No |
| | | | 95 | Liquid | 1.1 | 71.8 | 27.1 | 2.54 | Yes |
| | | | | Vapor | 1.7 | 76.6 | 21.7 | 3.27 | No |
| 5 | 93.5 | 6.5 | 0 | Liquid | 7.1 | 85.8 | 7.1 | 6.04 | No |
| | | | | Vapor | — | — | — | — | No |
| | | | 70 | Liquid | 2.8 | 85.0 | 12.2 | 5.67 | No |
| | | | | Vapor | 4.6 | 87.6 | 7.8 | 7.06 | No |
| | | | 95 | Liquid | 2.0 | 82.5 | 15.5 | 4.71 | No |
| | | | | Vapor | 3.0 | 86.8 | 10.2 | 6.58 | No |
| 6 | 95.0 | 5 | 0 | Liquid | 5.6 | 88.8 | 5.6 | 7.93 | No |
| | | | | Vapor | — | — | — | — | No |
| | | | 70 | Liquid | 2.9 | 89.7 | 7.4 | 8.7 | No |
| | | | | Vapor | 4.1 | 90.4 | 5.5 | 9.4 | No |
| | | | 95 | Liquid | 1.0 | 83.4 | 15.1 | 5.18 | No |
| | | | | Vapor | 1.8 | 88.2 | 10.0 | 7.47 | No |

[a]Analysis includes small amount of ethane and n-butane. Ingredients from left to right are listed in order of increasing boiling point.

EXAMPLE IV

This example illustrates the flammability of a fluorocarbon-hydrocarbon mixture where a portion of a fluorocarbon (FC-12) having a boiling point between that of the two principal components of the hydrocarbon mixture (A-70) is partially replaced with a fluorocarbon (FC-11) having a boiling point significantly higher than the boiling point of the highest boiling principal hydrocarbon component (isobutane). The data listed in Table IV indicate that flammability began at a fluorocarbon-to-hydrocarbon ratio of about 3.0/1.

TABLE IV

Hydrocarbon-Fluorocarbon Mixture

| Blend | Blend, Wt % FC-12 | Blend, Wt % A-70 | Blend, Wt % FC-11 | Wt. % Vented | Phase Tested | Composition Mole %[a] $C_3$ | FC-12 | $C_4$ | FC-11 | FC: Hydrocarbon Ratio | Flammability |
|---|---|---|---|---|---|---|---|---|---|---|---|
| 7 | 88 | 10 | 2 | 0 | Liquid | 9.7 | 77.0 | 11.7 | 1.6 | 3.67 | No |
|   |    |    |   |    | Vapor  | 20.2 | 75.5 | 4.4 | — | 3.07 | No |
|   |    |    |   | 25 | Liquid | 7.76 | 76.73 | 13.26 | 2.26 | 3.76 | No |
|   |    |    |   |    | Vapor  | 12.32 | 79.08 | 8.06 | 0.54 | 3.90 | No |
|   |    |    |   | 70 | Liquid | 4.66 | 75.21 | 15.81 | 4.33 | 3.89 | No |
|   |    |    |   |    | Vapor  | 8.33 | 80.29 | 10.59 | 0.79 | 4.28 | No |
|   |    |    |   | 95 | Liquid | 1.0 | 47.2 | 24.6 | 27.2 | 2.90 | Yes |
|   |    |    |   |    | Vapor  | 2.2 | 71.7 | 19.9 | 6.2 | 3.50 | No |
| 8 | 86 | 10 | 4 | 0 | Liquid | 10.91 | 74.42 | 11.70 | 2.97 | 3.42 | No |
|   |    |    |   |    | Vapor  | 16.86 | 77.92 | 5.22 | 0 | 3.53 | No |
|   |    |    |   | 25 | Liquid | 8.70 | 75.34 | 13.00 | 2.95 | 3.61 | No |
|   |    |    |   |    | Vapor  | 14.61 | 79.03 | 5.82 | 0.54 | 3.89 | No |
|   |    |    |   | 70 | Liquid | 5.0 | 67.2 | 18.4 | 9.3 | 3.26 | No |
|   |    |    |   |    | Vapor  | 16.2 | 77.2 | 6.4 | 0.2 | 3.42 | No |
|   |    |    |   | 95 | Liquid | Trace | 18.88 | 19.42 | 61.70 | 4.15 | b |
|   |    |    |   |    | Vapor  | 0.9 | 50.0 | 28.4 | 20.7 | 2.41 | Yes |

[a] See footnote a in Table III
[b] Unable to sample

EXAMPLE V

This example illustrates the flammability of a fluorocarbon-hydrocarbon mixture where a portion of a fluorocarbon (FC-12) having a boiling point between that of the two major ingredients of the hydrocarbon mixture (A-70) is partially replaced with a fluorocarbon (FC-114) having a boiling point higher than the boiling point of the highest boiling principal hydrocarbon component (isobutane). The data listed in Table V indicate that flammability began at a fluorocarbon-to-hydrocarbon ratio of about 3.0/1.

EXAMPLE VI

This example illustrates the flammability of a fluorocarbon-hydrocarbon mixture where the hydrocarbon used is mostly propane (boiling point −43.7° F.) and the fluorocarbon used is FC-22 (boiling point −41.7° F.). The data listed in Table VI indicate that with this particular blend the lowest fluorocarbon-hydrocarbon ratio found to be non-flammable was 6.69/1 (vapor phase Run 3). The next lower fluorocarbon-hydrocarbon ratio was 5.89/1 (Run 1) which showed to be flammable.

TABLE V

Flammability Level of a Hydrocarbon-Fluorocarbon Mixture

| Blend | Blend, Wt % FC-12 | Blend, Wt % A-70 | Blend, Wt % FC-114 | Wt. % Vented | Phase Tested | Composition, Mole %[a] $C_3$ | FC-12 | $C_4$ | FC-114 | FC: Hydrocarbon Ratio | Flammability |
|---|---|---|---|---|---|---|---|---|---|---|---|
| 9 | 86 | 10 | 4 | 0 | Liquid | 9.90 | 74.99 | 11.90 | 2.54 | 3.45 | No |
|   |    |    |   |    | Vapor  | 16.49 | 76.76 | 6.77 | trace | 3.30 | No |
|   |    |    |   | 25 | Liquid | 6.88 | 75.71 | 14.30 | 3.11 | 3.72 | No |
|   |    |    |   |    | Vapor  | 11.40 | 78.35 | 9.20 | 1.06 | 3.86 | No |
|   |    |    |   | 70 | Liquid | 4.91 | 72.13 | 18.22 | 4.74 | 3.32 | No |
|   |    |    |   |    | Vapor  | 8.12 | 79.21 | 11.02 | 1.65 | 4.22 | No |
|   |    |    |   | 95 | Liquid | 1.0 | 51.4 | 27.3 | 20.3 | 2.53 | Yes |
|   |    |    |   |    | Vapor  | 2.0 | 66.8 | 22.8 | 8.4 | 7.23 | No |
| 10 | 84 | 10 | 6 | 0 | Liquid | 10.49 | 73.96 | 11.65 | 3.90 | 3.52 | No |
|    |    |    |   |    | Vapor  | 15.51 | 75.63 | 7.08 | 1.78 | 3.43 | No |
|    |    |    |   | 25 | Liquid | 7.81 | 71.31 | 15.91 | 4.97 | 3.21 | No |
|    |    |    |   |    | Vapor  | 13.42 | 75.65 | 9.26 | 6.13 | 4.49 | No |
|    |    |    |   | 70 | Liquid | 4.26 | 68.21 | 18.62 | 8.91 | 3.37 | No |
|    |    |    |   |    | Vapor  | 6.94 | 76.00 | 13.16 | 3.90 | 3.98 | No |
|    |    |    |   | 95 | Liquid | 1.1 | 47.0 | 24.3 | 27.6 | 2.93 | Yes |
|    |    |    |   |    | Vapor  | 1.8 | 65.5 | 21.0 | 11.7 | 3.38 | No |
| 11 | 82 | 10 | 8 | 0 | Liquid | 10.6 | 73.2 | 11.6 | 4.6 | 3.50 | No |
|    |    |    |   |    | Vapor  | 15.5 | 75.0 | 7.1 | 2.4 | 3.42 | No |
|    |    |    |   | 25 | Liquid | 7.58 | 69.31 | 17.24 | 5.87 | 3.02 | No |
|    |    |    |   |    | Vapor  | 16.67 | 76.05 | 7.30 | 1.98 | 3.55 | No |
|    |    |    |   | 70 | Liquid | 3.87 | 69.00 | 15.80 | 11.31 | 4.08 | No |
|    |    |    |   |    | Vapor  | 7.75 | 77.31 | 10.81 | 4.12 | 4.39 | No |
|    |    |    |   | 95 | Liquid | 0.6 | 37.7 | 22.5 | 39.2 | 3.33 | No |
|    |    |    |   |    | Vapor  | 1.3 | 58.0 | 21.5 | 19.2 | 3.39 | No |

[a] See footnote a in Table III

TABLE VI

Flammability Level of a Hydrocarbon-Fluorocarbon Mixture

| Blend | Blend, Wt. % FC-22 | Blend, Wt. % A-108 | Blend, Wt. % FC-115 | Wt. % Vented | Phase Tested | Composition, Mole % C₃ | Composition, Mole % FC-22 | Composition, Mole % FC-115 | Fluorocarbon Hydrocarbon Ratio | Flamm-Ability |
|---|---|---|---|---|---|---|---|---|---|---|
| 12 | 92.0 | 8.0 | — | 0 | Liquid | 14.5 | 85.5 | — | 5.89 | Yes |
|    |      |     |   |   | Vapor  | 22.2 | 77.8 | — | 3.50 | Yes |
| 13 | 94.0 | 6.0 | — | 0 | Liquid | 11.5 | 88.5 | — | 7.69 | No |
|    |      |     |   |   | Vapor  | 17.6 | 82.4 | — | 4.68 | Yes |
| 14 | 95.9 | 4.1 |   | 0 | Liquid | 7.7  | 92.3 | — | 11.99 | No |
|    |      |     |   |   | Vapor  | 13.0 | 87.0 | — | 6.69 | No |
|    |      |     |   | 25 | Liquid | 5.4 | 94.6 | — | 17.52 | No |
|    |      |     |   |    | Vapor  | 9.0 | 91.0 | — | 10.11 | No |
|    |      |     |   | 70 | Liquid | 2.7 | 97.3 | — | 36.0 | No |
|    |      |     |   |    | Vapor  | 5.4 | 94.6 | — | 17.5 | No |
| 15 | 81.0 | 10.1 | 8.9 | 0 | Liquid | 18.5 | 77.1 | 4.4 | 4.41 | Yes |
|    |      |      |     |   | Vapor  | 22.6 | 72.2 | 5.2 | 3.42 | Yes |

BRIEF DESCRIPTION OF THE DRAWINGS

FIG. 1 is a bar graph of the various blends (liquid and vapor phase) before venting. The graph gives the mol % of total hydrocarbon in each phase and indicates whether the phase was flammable (F) or nonflammable (NF). The initial composition of each blend is given in terms of weight %.

FIG. 2 provides the same information for the various blends after 95% venting.

I claim:

1. A refrigeration process comprising employing as a refrigerant the composition comprising:
   (a) a first hydrocarbon,
   (b) a first halocarbon, and
   (c) a second hydrocarbon;
wherein the boiling point of (a) is less than the boiling point of (b); wherein the boiling point of (b) is less than the boiling point of (c); and wherein (b) is substantially nonflammable.

2. A process according to claim 1 wherein (b) is fluorocarbon.

3. A process according to claim 1 wherein neither the molecular weight of (a) nor the molecular weight of (c) exceeds about 72.

4. A process according to claim 1 wherein said refrigerant further comprises (d) a second halocarbon; wherein the boiling point of (c) is less than the boiling point of (d); and wherein (d) is substantially nonflammable.

5. A process according to claim 1 wherein said refrigerant further comprises (d) a second halocarbon; wherein the boiling point of (d) is less than the boiling point of (a); and wherein (d) is substantially nonflammable.

6. A process according to claim 1 wherein said refrigerant further comprises (d) a second halocarbon and (e) a third halocarbon; wherein the boiling point of (c) is less than the boiling point of (d); wherein the boiling point of (e) is less than the boiling point of (a); and wherein (d) and (e) are substantially nonflammable.

7. A process according to claim 1 wherein (a) is propane, (b) is dichlorodifluoromethane, and (c) is isobutane.

8. A process according to claim 7 wherein the amount of isobutane does not exceed about 9 weight percent; wherein the amount of propane does not exceed about 9 weight percent; wherein the total amount of isobutane and propane does not exceed about 12 weight percent; and wherein said weight percentages are based upon the total weight of (a), (b) and (c).

9. A process according to claim 7 wherein the amount of isobutane does not exceed about 5 weight percent; wherein the amount of propane does not exceed about 5 weight percent; wherein the total amount of isobutane and propane does not exceed about 7 weight percent; and wherein said weight percentages are based upon the total weight of (a), (b) and (c).

10. A process according to claim 1 wherein the amount of (a), in terms of weight, is about 70 to about 130 percent of the amount of (c).

11. A process according to claim 10 wherein the total amount of (a) and (b) does not exceed about 12 weight percent based upon the total weight of (a), (b) and (c).

12. A process according to claim 10 wherein (a) is propane, (b) is dichlorodifluoromethane, and (c) is isobutane.

13. A process according to claim 12 wherein the amount of propane, in terms of weight, is about equal to the amount of isobutane.

14. A process according to claim 1 wherein neither the amount of (a) nor the amount of (c) exceeds about 9 weight percent based upon the total weight of (a), (b) and (c).

15. A process according to claim 1 wherein the total hydrocarbon content of said refrigerant does not exceed about 12 weight percent based upon the total weight of hydrocarbon and halocarbon in said refrigerant.

16. A process according to claim 4 wherein (a) is propane, (b) is dichlorodifluoromethane, (c) is isobutane and (d) is trichlorofluoromethane.

17. A process according to claim 4 wherein (a) is propane, (b) is dichlorodifluoromethane, (c) is isobutane and (d) is 1,2-dichloro-1,1,2,2-tetrafluoroethane.

18. A process according to claim 17 wherein the amount of (a) does not exceed about 9 weight percent; wherein the amount of (c) does not exceed about 9 weight percent; wherein the total amount of (a) and (c) does not exceed about 12 weight percent; and wherein said weight percentages are based upon the total weight of (a), (b), (c) and (d).

19. A process according to claim 4 wherein the amount of (d) does not exceed about 20 percent by weight of (b).

20. A process according to claim 5 wherein the amount of (d) does not exceed about 20 percent by weight of (b).

21. A process according to claim 6 wherein neither the amount of (d) nor the amount of (e) exceeds about 20 percent by weight of (b).

22. A refrigeration process comprising employing as a refrigerant the composition comprising:
 (a) a first halocarbon,
 (b) a first hydrocarbon, and
 (c) a second halocarbon;
wherein the boiling point of (a) is less than the boiling point of (b); wherein the boiling point of (b) is less than the boiling point of (c); and wherein (a) and (c) are substantially nonflammable.

23. A process according to claim 22 wherein (a) is about 70 to about 130 percent by weight of (c).

24. A process according to claim 22 wherein the amount of (b) does not exceed about 12 weight percent based upon the total weight of (a), (b) and (c).

25. A process according to claim 22 wherein the total hydrocarbon content of said refrigerant does not exceed about 12 weight percent based upon the total weight of hydrocarbon and halocarbon in said refrigerant.

26. A composition comprising:
 (a) a first hydrocarbon,
 (b) a first halocarbon,
 (c) a second hydrocarbon, and
 (d) a second halocarbon;
wherein the boiling point of (a) is less than the boiling point of (b); wherein the boiling point of (b) is less than the boiling point of (c); wherein the boiling point of (c) is less than the boiling point of (d); and wherein (b) and (d) are substantially nonflammable.

* * * * *